United States Patent [19]

Mader et al.

[11] 4,444,893

[45] Apr. 24, 1984

[54] HIGHLY REFRACTIVE, LOW DISPERSION, LOW DENSITY OPTICAL GLASS SUITABLE FOR CORRECTIVE LENSES

[75] Inventors: Karl-Heinz Mader, Clarks Summit; Reinhard Kassner, Harding, both of Pa.

[73] Assignee: Schott Glass Technologies, Inc., Duryea, Pa.

[21] Appl. No.: 387,635

[22] Filed: Jun. 11, 1982

[51] Int. Cl.$^3$ .......................... C03C 3/04; C03C 3/10
[52] U.S. Cl. .................... 501/72; 351/168; 501/903
[58] Field of Search ................ 501/903, 55, 72; 351/168

[56] References Cited

U.S. PATENT DOCUMENTS

| | | | |
|---|---|---|---|
| 2,554,952 | 5/1951 | Mockrin et al. | 501/72 |
| 2,566,134 | 8/1951 | Mockrin et al. | 501/903 |
| 3,589,918 | 6/1971 | Jahn | 501/55 |
| 4,001,019 | 1/1977 | Yamashita et al. | 501/903 |

FOREIGN PATENT DOCUMENTS

| | | | |
|---|---|---|---|
| 56-59640 | 5/1981 | Japan. | |
| 2029401A | 3/1980 | United Kingdom | 501/903 |

*Primary Examiner*—Helen M. McCarthy
*Attorney, Agent, or Firm*—Millen & White

[57] ABSTRACT

An optical quality glass suitable for use in ophthalmic lenses having a refractive index of at least 1.59, an Abbe number of at least 40.5, a density of no greater than 2.67 g/cm$^{-3}$, and a coefficient of thermal expansion $\alpha$ of less than $90 \times 10^{-7}$ per °C. contains at least 90 mole % of $SiO_2$, $Li_2O$, $Na_2O$, $K_2O$, $CaO$, and $TiO_2$, and essentially does not contain $Al_2O_3$, $B_2O_3$, or oxides of elements having atomic weights above 90, such as $Nb_2O_5$, $La_2O_3$, or $ZrO_2$.

19 Claims, No Drawings

HIGHLY REFRACTIVE, LOW DISPERSION, LOW DENSITY OPTICAL GLASS SUITABLE FOR CORRECTIVE LENSES

BACKGROUND OF THE INVENTION

This invention relates to optical glass compositions having a refractive index of at least 1.59 while possessing relatively low dispersion ($V_d \geq 40.5$) and density ($\leq 2.67$ g cm$^{-3}$) characteristics.

Traditionally, the ophthalmic industry has produced and distributed crown glass lenses having a refractive index $n_d$ of $1.5231 \pm 0.0010$, a $V_d$ of 55–60, and a density of 2.5–2.6 g cm$^{-3}$. More recently, the use of plastic ophthalmic lenses composed of materials such as CR 39, which have similar optical characteristics but substantially lower densities than glass, has become widespread. Very high negative diopter prescriptions utilizing these materials have a very large edge thickness, while very large positive diopter prescriptions require very large center thicknesses. This is undesirable both from a cosmetic and a practical point of view.

The introduction of Schott S-1005 ophthalmic glass (U.S. Pat. No. 3,898,093), which has a substantially higher refractive index than traditional ophthalmic crowns and a relatively low density compared to other optical quality glasses of equivalent refractive index (see Table 1 below), has permitted substantial reductions in edge and/or center thicknesses as well as significant weight reductions relative to traditional crown glasses for higher diopter prescriptions.

TABLE 1

Properties of Existing Ophthalmic Materials

| Material | $n_d$ | $V_d$ | density (gcm$^{-3}$) | $\alpha_{20-300°}$ C. $\times$ 10$^{-7\circ}$ C.$^{-1}$ |
|---|---|---|---|---|
| Schott S-3 Opthalmic Crown | 1.5231 | 56.9 | 2.61 | 96.2 |
| Schott S-1002 Opthalmic Flint | 1.7013 | 29.7 | 4.05 | 85.9 |
| Schott S-1055 | 1.701 | 31.1 | 2.99 | 101 |
| Sovirel D00.35 | 1.700 | 34.5 | 3.18 | |
| Hoya LH1 | 1.702 | 40.2 | 2.99 | 98 |
| Hoya LH1-11 | 1.600 | 40.2 | 2.59 | |
| CR 39 | 1.501 | | 1.32 | |

This glass composition, however, exhibits one significant disadvantage; namely, its relatively high dispersion leads to chromatic aberration effects which are annoying to users of prescription lenses.

Since the introduction of S-1005, efforts have been made to develop an alternative glass with the same high refractive index and relatively low density but with lower dispersion. Sovirel D00.35 ophthalmic glasses (French Pat. No. 2,395,961) as well as the Hoya composition LH-1 (U.S. Pat. No. 4,084,978) are the principal alternative compositions which have been developed. Their properties are also listed in Table 1. The Hoya composition LH1-I exhibits substantially lower dispersion although its refractive index and density are very close to those of S-1005, whereas the Sovirel glass dispersion is between that of LH1-I and S-1005.

In a more recent development, Hoya Glass Works introduced LH1-11, an alternate high index crown glass with good dispersion characteristics but having substantially lower density (Japanese disclosure No. 8159640). This glass, while having a lower refractive index than any of the other compositions described (see Table 1), still provides substantial weight reductions in high diopter prescriptions when compared to normal ophthalmic crown glass.

SUMMARY OF THE INVENTION

Accordingly, it is an object of this invention to provide a high quality optical glass of relatively high refractive index, relatively low dispersion, relatively low density compared to standard ophthalmic crown compositions.

It is another object of this invention to provide highly refractive, relatively light weight ophthalmic lenses which have lower dispersion than prior art products.

It is a further object of this invention to provide a glass having the above properties which can be fused with other optical crown glasses of compatible properties so as to form a multifocal eyeglass lens or to prepare other compound optical elements.

It is an additional object of this invention to provide such a glass which can be easily processed into eyeglasses either of single element, or utilizing fusion processes mentioned above, multifocal varieties.

It is yet another object of this invention to provide a glass having the above properties which can be chemically strengthened by conventional ion-exchange techniques.

Upon further study of the specification and appended claims, further objects and advantages of this invention will become apparent to those skilled in the art.

The above objects have been attained by the present invention by providing an optical quality glass suitable for use in eyeglass lenses, and which has a refractive index $n_d$ of at least 1.59, an Abbe number $V_d$ of at least 40.5, a density of not more than 2.67 g cm$^{-3}$, and a coefficient of thermal expansion of less than $90 \times 10^{-7}$ per °C., containing at least 90 mole % in total of SiO$_2$, Na$_2$O, Li$_2$O, K$_2$O, CaO, and TiO$_2$ and not containing Al$_2$O$_3$, B$_2$O$_3$, or high molecular weight oxides such as Nb$_2$O$_5$, La$_2$O$_3$, or ZrO$_2$, i.e., those containing elements of atomic weights greater than 90, and comprising:

60–75 wt. % SiO$_2$;
10–15 wt. % total Li$_2$O, Na$_2$O, and K$_2$O, including 3–13% Na$_2$O and typically 0–2 wt. % of Li$_2$O and 0–12 wt. % of K$_2$O;
5–12 wt. % alkaline earth metal oxides, typically 5–12 wt. % of CaO;
12–18 wt. % TiO$_2$.

DETAILED DISCUSSION

The glasses of this invention have refractive index, dispersion, and density characteristics similar to those of LH1-11 but are of substantially different chemical composition than LH1-11 or any of the other higher index, low density, compositions heretofore described. This difference in chemical composition also results in substantially lower costs for production of the glass, representing substantial benefit to both the producer and consumer of optical glasses.

This range of glass compositions of this invention is in strong contrast to the prior art glass compositions having high refractive index and low density as previously discussed, including S-1005. Most of these, as may be seen from Table 2, contain significant concentrations of heavy oxide elements with molecular weights greater than 100; namely, Nb$_2$O$_5$, Ta$_2$O$_5$, La$_2$O$_3$, and ZrO$_2$. LH1-11, which is most similar to this invention, limits the concentration of these elements to no more than 2% by weight. However, the amounts of alkaline earth metal oxides required by this invention are 5 to 12 wt. %, especially of CaO. This is far outside the compositional limits for alkaline earth content of LH1-11, the typical composition having no alkaline earth metal content. In addition, the glass of this invention does not contain $B_2O_3$, whereas the corresponding compositional range for LH1-11 is 0-7.0% $B_2O_3$, typically containing 3.8% $B_2O_3$ by weight. Furthermore, the glass of this invention does not contain aluminum oxide, whereas the corresponding compositional range of LH1-11 is 0-5% of $Al_2O_3$, with a typical composition containing 1.4% $Al_2O_3$ by weight.

The preferred compositional ranges of this invention are generally 62-64 wt. % of $SiO_2$; 0-0.5 wt. % of $Li_2O$, typically 0.1-0.5 wt. % thereof when $Li_2O$, in fact, is present; 3-6 wt. % of $Na_2O$; 0-10 wt. % of $K_2O$, typically 0.1 to 10 wt. % thereof when $K_2O$, in fact, is present; 12-13 wt. % of total alkali metal oxides, ($Li_2O$, $Na_2O$, $K_2O$); 7.4-9.6 wt. % of alkaline earth metal oxides, typically 7.4-9.6 wt. % of CaO, although suitable alkaline earth metals for use in this invention include all those with the requisite atomic weight lower than 90, e.g., Mg, Ca and Sr; and 13.5 to 16.5 wt. % of $TiO_2$.

TABLE 2

Chemical Composition of Existing High Index, Low Density Opthalmic Glasses (Typical Data Based on Chemical Analysis of Typical Samples)

| Wt. % | S-1005 (SF64N) limits | S-1005 (SF64N) typical | LH1-1 limits | LH1-1 typical | LH1-11 limits | LH1-11 typical |
|---|---|---|---|---|---|---|
| $SiO_2$ | 40-45 | 43 | | 41.5 | 55-67 | 62.5 |
| $B_2O_3$ | 2-6 | 2.75 | | 5.07 | 0-7 | 3.8 |
| $Al_2O_3$ | 0-2 | — | | — | 0-5 | 1.4 |
| $Li_2O$ | 0-4 | 1.0 | | 7.71 | 0-7 | 4.0 |
| $Na_2O$ | 6-16 | 10.0 | | 0.04 | 0-11 | 5.9 |
| $K_2O$ | 0-10 | 4.75 | | 0.03 | 0-10 | 6.6 |
| $\Sigma R_2O$ | 12-17 | 15.75 | | 7.78 | 11-18 | 16.5 |
| MgO | 0-4 | — | | 0.06 | | — |
| CaO | 0-6 | 2.0 | | 19.65 | | — |
| BaO | 0-10 | — | | — | | — |
| SrO | 0-10 | 3.5 | | 0.02 | | — |
| $\Sigma$ RO | | 5.5 | | 19.73 | 0-4 | 0 |
| $TiO_2$ | 24-26 | 25 | | 11.0 | 13-19 | 15.9 |
| $La_2O_3$ | 0-5 | — | | — | | — |
| $Ta_2O_5$ | 0-3 | — | | — | | — |
| $Nb_2O_5$ | 0-5 | 0.3 | | 9.5 | | — |
| $ZrO_2$ | 2-7 | 3.5 | | 5.0 | | — |
| $\Sigma$ La, Ta, Nb, Zr | | 3.8 | | 14.5 | 0-2 | 0 |
| ZnO | 0-7 | 1.5 | | — | | — |
| PbO | — | — | | 0.02 | | — |

The combination of calcium and titanium oxides as part of a mixed alkali metal silica glass is one particularly unique feature of this invention. Titanium dioxide is generally known in the glass industry to contribute highly to the refractive index and little to the density of a glass. On the other hand, it has a high negative influence on the dispersion, e.g., it lowers the Abbe Constant $V_d$, resulting in an undesired prismatic aberration of a glass lens. The amount of $TiO_2$ of this invention achieves the proper balance between these effects. The amount of alkaline earth metal oxides required by this invention provides the best balanced effect on the combination of properties of refractive index, dispersion and density in the resultant glass system. CaO is preferred in this regard. Lithium oxide introduction results in a substantially higher compactness of the glass matrix; therefore, it imparts a higher index of refraction with the least effect on the glass density as compared to the oxides of sodium and/or potassium.

The glasses according to this invention consist essentially solely of $SiO_2$, alkaline earth oxides, preferably CaO, but also SrO or MgO, $TiO_2$, and $R_2O$, the latter being a combination of $Li_2O$, $Na_2O$, and $K_2O$. They do not contain, with the exception of trace quantities of refining agents, elements with atomic weights greater than 90. Such refining agents typically include $As_2O_3$ or $Sb_2O_3$; amounts of 0.1-0.3% generally being sufficient. However, depending upon production technique, higher concentrations of refining agents, e.g., up to 1%, may be used as is fully conventional in the art. The amounts of such conventionally employed refining agents are ineffective to have a significant influence on the optical properties of the glasses of this invention. The same is true with respect to other excluded elements, such as those having atomic weights greater than 90. It is possible for trace amounts of such elements to be present, e.g., as economically or otherwise practically unavoidable impurities, e.g., in amounts less than 0.1 wt. %. However, such amounts will be ineffective to substantially alter the essential optical properties of the glasses of this invention.

It is also possible for the glasses of this invention to be colored. For this purpose, coloring effective amounts of conventional colorants (which may have atomic weights larger than 90) such as Fe or Cr, etc. can be included. These do not significantly affect the specific optical properties mentioned above.

The glasses of this invention have the following properties:

(a) refractive index $n_d \geq 1.59$, generally 1.601-1.605,
(b) Abbe numbers $V_d \geq 40.5$, generally 40.5-42.0,
(c) densities $\leq 2.67$ g cm$^{-3}$, generally 2.62-2.65,
(d) expansion coefficients, $\alpha$, $\leq 90 \times 10^{-7}$ per °C., generally 78-87.

The glasses also have other valuable properties. For example, they may be conventionally fused with other glasses of compatible properties to provide multifocal lenses or to prepare any other sort of compound optical element. They can be readily pressed into lens blanks, also by fully conventional techniques. Moreover, they can be chemically strengthened by conventional ion-exchange techniques. See, e.g., U.S. Pat. No. 3,790,260.

The glasses of this invention can be prepared by any of the conventional methods used to prepare optical glasses, especially those of related compositions, usually continuous tank manufacturing. Similarly, optical elements can be fabricated from the glasses of this invention by using any of the conventional methods employed in conjunction with optical glasses, especially those of related composition.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A number of typical sample glass compositions within the scope of this invention, as well as their representative properties, are given in Table 3 in weight percent and in Table 4 in molar percent. Of these compositions Nos. 1, 2, 3, and 4 are preferred.

All of the glasses of the examples were conventionally fabricated by batch melting. For example, the requisite weights of each batch ingredient corresponding to the desired end wt. % content, were melted in a one half liter platinum crucible by induction heating, e.g., to 1250°–1280° C. for 2 hours. The glass was then refined at 1450° C. for 3.5 hours, homogenized at 1500° C. with stirring for 1 hour and then cast at 1260° C. The product was annealed for 2 hours at a temperature 20 C.° above $T_g$ and then cooled to room temperature at a rate of 40 C.°/hour.

Typically, batch ingredients for each final glass component were $SiO_2$—quartz; $Na_2O$—$Na_2CO_3$, NaCl and $Na_2SO_4$; $K_2O$—$K_2CO_3$; $Li_2O$—$Li_2CO_3$; CaO—$CaCO_3$; $TiO_2$—$TiO_2$; and $As_2O_3$—$As_2O_3$.

EXAMPLE 2

Three more preferred compositions, Nos. 14, 15, and 16, as well as their representative properties are given in weight percent in Table 5 and in molar percent in Table 6. These compositions are preferred due to their more desirable combinations of high refractive index and low density.

TABLE 5

| Wt. % | Preferred Compositions | | |
|---|---|---|---|
| | 14 | 15 | 16 |
| $SiO_2$ | 63.14 | 63.25 | 62.82 |
| $Li_2O$ | 0.23 | 0.34 | — |
| $Na_2O$ | 5.01 | 5.02 | 4.98 |
| $K_2O$ | 7.27 | 7.29 | 7.97 |
| CaO | 7.99 | 8.01 | 7.95 |
| $TiO_2$ | 16.26 | 16.01 | 16.18 |
| $As_2O_3$ | 0.19 | 0.08 | 0.1 |
| $\Sigma R_2O$ | 12.51 | 12.65 | 12.95 |
| $\Sigma$ RO | 7.99 | 8.01 | 7.95 |
| $n_d$ | 1.60169 | 1.60021 | 1.59853 |
| $V_d$ | 40.52 | 40.83 | 40.83 |
| density (gcm$^{-3}$) | 2.63 | 2.63 | 2.63 |
| $\alpha_{20-300}$ ($\times 10^{-7}$°C.$^{-1}$) | 78.8 | 78.8 | 79.2 |
| $T_g$ (°C.) | 601 | 596 | 610 |
| Littleton Softening Point (°C.) | 753 | 748 | — |
| Surface compression after chemical strengthening (nm/cm) | 1156 | 1150 | 765 |

TABLE 3

| Wt. % | Typical Compositions | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $SiO_2$ | 62.6 | 62.6 | 62.6 | 62.6 | 62.6 | 63.6 | 62.6 | 62.6 | 62.6 | 62.6 | 63.12 | 63.26 | 63.19 |
| $Li_2O$ | — | — | — | 0.5 | 0.5 | 0.5 | — | — | — | — | 0.23 | 0.48 | 0.48 |
| $Na_2O$ | 3.0 | 11.0 | 13.0 | 12.0 | 12.0 | 12.0 | 12.0 | 3.0 | 10.0 | 5.0 | 5.30 | 10.10 | 10.09 |
| $K_2O$ | 10.0 | 2.0 | — | 0.5 | 1.5 | 0.5 | 1.0 | 10.0 | 3.0 | 8.0 | 7.27 | 1.51 | 2.27 |
| CaO | 9.3 | 9.3 | 9.3 | 9.5 | 8.5 | 9.5 | 9.5 | 9.3 | 9.5 | 9.3 | 7.73 | 9.60 | 9.59 |
| $TiO_2$ | 14.7 | 14.7 | 14.8 | 14.8 | 14.8 | 13.8 | 14.8 | 15.0 | 14.8 | 15.0 | 16.26 | 14.96 | 14.30 |
| $As_2O_3$ | 0.3 | 0.3 | 0.3 | 0.1 | 0.1 | 0.1 | 0.1 | 0.1 | 0.1 | 0.1 | 0.09 | 0.1 | 0.10 |
| $\Sigma R_2O$ | 13.0 | 13.0 | 13.0 | 13.0 | 14.0 | 13.0 | 13.0 | 13.0 | 13.0 | 13.0 | 12.80 | 12.09 | 12.84 |
| $\Sigma$ RO | 9.3 | 9.3 | 9.3 | 9.5 | 8.5 | 9.5 | 9.5 | 9.3 | 9.5 | 9.3 | 7.73 | 9.60 | 9.59 |
| $n_d$ | 1.59195 | 1.59955 | 1.60158 | 1.60431 | 1.60057 | 1.59713 | 1.60121 | 1.59350 | 1.60057 | 1.59646 | 1.60104 | 1.60367 | 1.60062 |
| $V_d$ | 42.38 | 41.75 | 41.53 | 41.50 | 41.64 | 42.61 | 41.65 | 42.17 | 41.65 | 41.89 | 40.58 | 41.44 | 41.86 |
| density (gcm$^{-3}$) | 2.62 | 2.66 | 2.65 | 2.67 | 2.66 | 2.67 | 2.62 | 2.66 | 2.63 | 2.63 | 2.63 | 2.66 | 2.66 |
| $\alpha_{20-300}$ ($\times 10^{-7}$°C.$^{-1}$) | 78.7 | 86.4 | 86.8 | 89.7 | 89.1 | — | 87.1 | 79.6 | — | 81.2 | 78.8 | 83.1 | 85.4 |
| $T_g$ (°C.) | 623 | 595 | 590 | 580 | 575 | — | 600 | 619 | 739 | 615 | 601 | 586 | 585 |
| Littleton Softening Point (°C.) | 779 | 738 | 736 | 722 | 716 | — | — | — | — | 763 | 749 | 728 | 727 |
| Surface compression after chemical strengthening (nm/cm) | 500 | — | 570 | 890 | 1200 | 660 | 740 | 835 | 740 | 1040 | — | — | 950 |

TABLE 4

| Molar % | Typical Compositions | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $SiO_2$ | 67.30 | 65.41 | 64.96 | 64.61 | 64.88 | 65.47 | 65.07 | 67.20 | 65.52 | 66.72 | 67.22 | 65.52 | 65.52 |
| $Li_2O$ | — | — | — | 1.04 | 1.04 | 1.03 | — | — | — | — | 0.50 | 1.0 | 1.00 |
| $Na_2O$ | 3.13 | 11.15 | 13.08 | 12.01 | 12.06 | 11.98 | 12.09 | 3.12 | 10.14 | 5.17 | 5.47 | 10.14 | 10.14 |
| $K_2O$ | 6.86 | 1.83 | — | 0.33 | 0.99 | 0.33 | 0.66 | 6.85 | 2.00 | 5.44 | 4.94 | 1.0 | 1.50 |
| CaO | 10.71 | 10.41 | 10.34 | 10.50 | 9.44 | 10.48 | 10.58 | 10.69 | 10.65 | 10.62 | 8.82 | 10.65 | 10.65 |
| $TiO_2$ | 11.89 | 11.56 | 11.55 | 11.49 | 11.53 | 10.68 | 11.57 | 12.11 | 11.65 | 12.02 | 13.02 | 11.65 | 11.15 |
| $As_2O_3$ | 0.1 | 0.1 | 0.1 | .03 | .06 | 0.03 | 0.03 | 0.03 | 0.03 | 0.03 | 0.03 | 0.03 | 0.03 |
| $\Sigma R_2O$ | 9.99 | 12.48 | 13.08 | 13.38 | 14.09 | 13.34 | 12.75 | 9.97 | 12.14 | 10.61 | 10.91 | 12.14 | 12.64 |
| $\Sigma$ RO | 10.71 | 10.41 | 10.34 | 10.50 | 9.44 | 10.48 | 10.58 | 10.69 | 10.65 | 10.62 | 8.82 | 10.65 | 10.65 |
| $n_d$ | 1.59195 | 1.59955 | 1.60158 | 1.60431 | 1.60057 | 1.59713 | 1.60121 | 1.59356 | 1.60057 | 1.59646 | 1.60104 | 1.60367 | 1.60062 |
| $V_d$ | 42.38 | 41.75 | 41.53 | 41.50 | 41.64 | 42.61 | 41.65 | 42.17 | 41.65 | 41.89 | 40.58 | 41.44 | 41.86 |
| density (gcm$^{-3}$) | 2.62 | 2.66 | 2.65 | 2.67 | 2.66 | 2.66 | 2.67 | 2.62 | 2.66 | 2.63 | 2.63 | 2.66 | 2.66 |
| $\alpha_{20-300}$ ($\times 10^{-7}$°C.$^{-1}$) | 78.7 | 86.4 | 86.8 | 89.7 | 89.1 | — | 87.1 | 79.6 | — | 81.2 | 78.8 | 83.1 | 85.4 |
| $T_g$ (°C.) | 623 | 595 | 590 | 580 | 575 | — | 600 | 619 | 739 | 615 | 601 | 586 | 585 |
| Littleton Softening Point (°C.) | 779 | 738 | 736 | 722 | 716 | — | — | — | — | 763 | 749 | 728 | 727 |
| Surface compression after chemical strenghthening (nm/cm) | 500 | — | 570 | 890 | 1200 | 660 | 740 | 835 | 740 | 1040 | — | — | 950 |

TABLE 6

| Molar % | Preferred Compositions | | |
|---|---|---|---|
| | 14 | 15 | 16 |
| SiO$_2$ | 67.22 | 67.22 | 67.22 |
| Li$_2$O | 0.5 | 0.72 | — |
| Na$_2$O | 5.17 | 5.17 | 5.17 |
| K$_2$O | 4.94 | 4.94 | 5.44 |
| CaO | 9.12 | 9.12 | 9.12 |
| TiO$_2$ | 13.02 | 12.80 | 13.02 |
| As$_2$O$_3$ | 0.03 | 0.03 | 0.03 |
| Σ R$_2$O | 10.61 | 10.83 | 10.61 |
| Σ RO | 9.12 | 9.12 | 9.12 |
| n$_d$ | 1.60169 | 1.60021 | 1.59853 |
| V$_d$ | 40.52 | 40.83 | 40.83 |
| density (gcm$^{31\ 3}$) | 2.63 | 2.63 | 2.63 |
| $\alpha_{20-300}$ ($\times 10^{-7}$·C.$^{-1}$) | 78.8 | 78.8 | 79.3 |
| Tg (°C.) | 601 | 596 | 610 |
| Littleton Softening Point (°C.) | 753 | 748 | 765 |
| Surface compression after chemical strengthening (nm/cm) | 1156 | 1150 | — |

EXAMPLE 3

Using composition 14 as an illustrative example, polished samples 2.0×5.0 cm×0.2 cm thick were treated using a standard ophthalmic chemical strengthening unit (OMI Automatic Lens Hardener). The chemical composition of the molten salt bath was 99% KNO$_3$, 0.5% NaNO$_3$, and 0.5% silicic acid. Treatment temperature was 450°-600° C. and the treatment time was 16 hours. Surface compression after treatment as measured by birefringence, was 1156 nm/cm, comparable to the surface compression obtained after chemically strengthening standard S-1 ophthalmic crown glass.

EXAMPLE 4

Again, using the properties of composition 14 as an illustrative example, the masses and edge thicknesses of a number of different corrective lenses of negative diopter value were conventionally calculated. Equivalent calculations were made utilizing the properties of S-3, S-1005, and CR 39 as lens materials. It should be noted that the use of the glasses of this invention in negative diopter prescriptions gives a substantially greater decrease in lens weight and edge thickness than when used for positive diopter prescriptions. Thus, they are particularly well suited for use in negative diopter lenses, although weight savings with respect to standard zinc ophthalmic crowns are afforded in both instances.

The calculations show that for negative powers of greater than or equal to −1 diopter, the glasses of this invention provide a substantial weight reduction over equivalent lenses made of S-3 crown. For many high diopter prescriptions this weight savings is 15% or greater. For some very strong negative lenses (above 10 diopter) S-1005 provides slightly greater weight savings than does the glass of this invention. However, in all examples, the glass of this invention provides substantially greater weight savings relative to S-1005 for the maximum of relatively mild prescriptions (low diopter values). For example, for a 6.5 mm diameter lens having a front power of 0 diopter, the use of the glass of this invention instead of S-1005 provides a greater % weight savings relative to S-3 crown for lens powers of up to −12 diopter. Above this value, S-1005 provides a greater % weight reduction due to its higher refractive index. The calculated absolute masses of 6.5 mm $\phi$ lenses having a front power of 0 diopter or of +1.25 diopter and made of the glass of this invention, S-3, or S-1005 again demonstrate the weight savings effected by the use of the glass of this invention relative to traditional ophthalmic glasses.

In all cases, utilization of the glasses of this invention provides a significant reduction in the lens edge thickness compared to equivalent lenses made of S-3 or CR 39 plastic lens material. For high diopter values, this reduction in edge thickness relative to CR 39 is substantial; in some cases greater than 35%.

EXAMPLE

As in example 4, and using composition 14 as an illustrative example, the masses and center thicknesses of a number of different corrective lenses of positive diopter value made from the glass of this invention were conventionally calculated using refractive index and density data given in Table 5. Equivalent calculations were made for the same series of lenses were made for S-3 ophthalmic crown, S-1005 high index, low density glass, and CR 39 plastic lens material. The data clearly show that for almost evey lens configuration given, the use of the glass of this invention provides a measurable reduction in lens weight compared to the use of typical zinc crown ophthalmic glasses such as Schott S-3. For many of the high positive diopter prescriptions tested, this weight savings is close to 15%. For very strong positive corrective lenses (high diopter values) S-1005 provides a slightly greater weight savings than does the glass of this invention. However, in all calculated examples, the glass of this invention provides a greater weight savings relative to S-1005 for prescriptions with powers below 5 diopter. For example, for a 6.5 mm diameter lens having a front power of +8.25 diopter, the use of the glass of this invention instead of S-1005 provides a greater % weight savings relative to S-3 crown for lens powers of up to 5 diopter. Above this value S-1005 provides a greater % weight savings due to its higher refractive index. The calculated absolute masses of 6.5 mm diameter lenses having a front power of +6.25 diopter or of +8.25 diopter and made of the glass of this invention, S-3, and S-1005 again demonstrate the weight savings effected by this invention.

In all cases tested, use of the glass of this invention provides a significant reduction in the lens center thickness compared to equivalent positive lenses made of S-3 or CR 39 plastic lens material. For high diopter values, the reduction in thickness relative to CR 39 may be as great as 25%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical glass having a refractive index n$_d$ of 1.590–1.605, an Abbe number V$_d$ of 40.5–42.0, a density of 2.62–2.67 g cm$^{-3}$, and a coefficient of thermal expansion $\alpha$ of 78–90×10$^{-7}$ per °C., consisting essentially of in wt percent:

60–75 wt.% SiO$_2$
0–2 wt.% Li$_2$O
3–13 wt.% Na$_2$O
0–12 wt.% K$_2$O

10–15 wt.% total of $Li_2O$, $Na_2O$ and $K_2O$
5–12 wt.% total of alkaline earth metal oxide MgO, CaO or SrO 12–18 wt.% of $TiO_2$ 0–0.1 wt.% of a refining agent,
optionally, a coloring effective amount of a colorant conventional in optical glass, and
otherwise essentially free of $Al_2O_3$, $B_2O_3$ and oxides of elements having atomic weights greater than 90.

2. An optical glass of claim 1 consisting essentially of said amounts of oxides and essentially no colorant.

3. An optical glass of claim 1 or 2 containing an amount effective, for refining, of $As_2O_3$ or $Sb_2O_3$.

4. An optical glass of claim 3 wherein the refining agent is $As_2O_3$.

5. An optical glass of claim 1 containing a colorant.

6. An optical glass of claim 1 wherein the amounts of said oxides are:
62–64 wt.% $SiO_2$
0–0.5 wt.% $Li_2O$
3–6 wt.% $Na_2O$
0–10 wt.% $K_2O$
12–13 wt.% total of $Li_2O$, $Na_2O$ and $K_2O$
7.4–9.6 wt.% total of alkaline earth metal oxide MgO, CaO or SrO
13.5–16.5 wt.% $TiO_2$ 7. An optical glass of claim 6 wherein the amount of $Li_2O$ is 0.1–0.5% and the amount of $K_2O$ is 0.1–10%.

8. An optical glass of claim 1 or 6 wherein the alkaline earth metal oxide is essentially solely CaO.

9. An optical glass of claim 1 wherein the amount of CaO is 5–12 weight %.

10. An optical glass of claim 1 wherein the amount of CaO is 7.4–9.6 weight %.

11. An optical glass of claim 1 consisting essentially of, in % by weight:
62.6–63.0 wt.% $SiO_2$
4.8–5.2 wt.% $Na_2O$
7.8–8.2 wt.% $K_2O$
7.75–8.05 wt.% CaO
16.0–16.4 wt.% $TiO_2$.

the remainder, if any, being an amount of $As_2O_3$ equal to or less than 0.1% by weight.

12. An optical glass of claim 1 consisting essentially of, in % by weight:
62.95–63.35 wt.% $SiO_2$
0.18–0.28 wt.% $Li_2O$
4.8–5.2 wt.% $Na_2O$
7.1–7.5 wt.% $K_2O$
7.8–8.2 wt.% CaO
16.1–16.5 wt.% $TiO_2$
the remainder, if any, being an amount of $As_2O_3$ equal to or less than 0.1% by weight.

13. An optical glass of claim 1 consisting essentially of, in % by weight:
63.0–63.4 wt.% $SiO_2$
0.30–0.40 wt.% $Li_2O$
4.8–5.2 wt.% $Na_2O$
7.1–7.5 wt.% $K_2O$
7.8–8.2 wt.% CaO
15.8–16.2 wt.% $TiO_2$
the remainder, if any, being an amount of $As_2O_3$ equal to or less than 0.1% by weight.

14. An optical glass of claim 1 having the following optical properties:

| | |
|---|---|
| $n_d$ | 1.601–1.605 |
| $V_d$ | 40.5–42.0 |
| density | 2.62–2.65 g/cm$^3$ |
| $\alpha$ | 78–87 per °C. |

15. An optical glass of claim 1 which has been chemically strengthened by ion exchange treatment.

16. An optical lens comprising optical glass of claim 1.

17. An optical lens of claim 16 which is an eyeglass lens.

18. A compound optical element comprising an optical glass of claim 1 fused with another optical glass.

19. A compound optical element of claim 18 which is a multifocal lens.

* * * * *